(12) United States Patent
Honda et al.

(10) Patent No.: US 12,338,932 B2
(45) Date of Patent: Jun. 24, 2025

(54) PIPE BRANCHING DEVICE AND COMPRESSOR

(71) Applicant: MITSUBISHI HEAVY INDUSTRIES ENGINE & TURBOCHARGER, LTD., Sagamihara (JP)

(72) Inventors: Hironori Honda, Tokyo (JP); Nobuhito Oka, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/289,184

(22) PCT Filed: Jun. 6, 2022

(86) PCT No.: PCT/JP2022/022820
§ 371 (c)(1),
(2) Date: Nov. 1, 2023

(87) PCT Pub. No.: WO2022/264856
PCT Pub. Date: Dec. 22, 2022

(65) Prior Publication Data
US 2024/0369168 A1 Nov. 7, 2024

(30) Foreign Application Priority Data
Jun. 16, 2021 (JP) .................... 2021-100383

(51) Int. Cl.
*F16L 41/02* (2006.01)
*F04D 17/10* (2006.01)
*F04D 29/42* (2006.01)

(52) U.S. Cl.
CPC .............. *F16L 41/02* (2013.01); *F04D 17/10* (2013.01); *F04D 29/4206* (2013.01)

(58) Field of Classification Search
CPC ............ F16L 41/02; F16L 41/08; F16L 41/12
See application file for complete search history.

(56) References Cited

U.S. PATENT DOCUMENTS 2,502,206 A * 3/1950 Creek ..................... F16L 41/08
251/149.1
2,921,801 A * 1/1960 Beyer ..................... F16L 41/12
285/306

(Continued)

FOREIGN PATENT DOCUMENTS

JP   54-56014 U   4/1979
JP   64-26638 U   2/1989

(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2022/022820, dated Dec. 14, 2023.
International Search Report and Written Opinion of the International Searching Authority for International Application No. PCT/JP2022/022820, dated Jul. 12, 2022.

*Primary Examiner* — Matthew Troutman
*Assistant Examiner* — Fannie Kee
(74) *Attorney, Agent, or Firm* — Birch, Stewart, Kolasch & Birch, LLP

(57) ABSTRACT

This pipe branching device is provided with a main pipe and a branch pipe branching off from the main pipe. The main pipe includes a first pipe and a second pipe fitted into the first pipe in an axial direction of the first pipe. A chamber communicating with the branch pipe is provided between the first pipe and the second pipe. A flow path communicating with the chamber from the inside of the second pipe is provided.

8 Claims, 16 Drawing Sheets

(56) References Cited

U.S. PATENT DOCUMENTS

| | | | | |
|---|---|---|---|---|
| 3,088,757 | A | * | 5/1963 | McIntosh ................ F16L 41/08 |
| | | | | 411/965 |
| 3,740,247 | A | * | 6/1973 | Schweigert et al. .... F16L 41/02 |
| | | | | 428/920 |
| 9,429,253 | B1 | * | 8/2016 | Vicknair ................ F16L 41/08 |
| 10,526,960 | B2 | * | 1/2020 | Kojima .................. F16L 41/08 |
| 2013/0232971 | A1 | | 9/2013 | Miazgowicz et al. |
| 2014/0069096 | A1 | | 3/2014 | Muruyama |
| 2016/0069302 | A1 | | 3/2016 | Tabata |
| 2016/0265542 | A1 | * | 9/2016 | Annati .................... F16L 41/08 |
| 2017/0144769 | A1 | * | 5/2017 | Beers ..................... F16L 41/08 |
| 2021/0215171 | A1 | * | 7/2021 | Fujita ..................... F16L 41/08 |
| 2023/0175524 | A1 | * | 6/2023 | Iwakiri .................. F16L 41/08 |
| | | | | 415/116 |

FOREIGN PATENT DOCUMENTS

| | | | | | |
|---|---|---|---|---|---|
| JP | 8-74603 | A | | 3/1996 | |
| JP | 2007-154675 | A | | 6/2007 | |
| JP | 2009-24692 | A | | 2/2009 | |
| JP | 2015-169124 | A | | 9/2015 | |
| JP | 2017-15026 | A | | 1/2017 | |
| JP | 2019094847 | A | * | 6/2019 | ............. F16L 41/08 |
| KR | 20030062621 | A | * | 7/2003 | ............. F16L 41/08 |
| KR | 10-2016-0037699 | A | | 4/2016 | |
| WO | WO 2012/157598 | A1 | | 11/2012 | |
| WO | WO 2014/170954 | A1 | | 10/2014 | |

\* cited by examiner

PIPE BRANCHING DEVICE AND COMPRESSOR

TECHNICAL FIELD

The present disclosure relates to a pipe branching device and a compressor.

This application claims priority based on Japanese Patent Application No. 2021-100383 filed on Jun. 16, 2021, the entire disclosure of which is incorporated herein.

BACKGROUND ART

In a fluid machine such as a turbo machine, a configuration where a main flow is extracted using a branch pipe is adopted for controllability improvement. In such a configuration, when a valve is provided in the middle of the branch pipe, a pressure loss caused by inflow of the main flow into the branch pipe occurs.

In order to reduce the pressure loss caused by the inflow of the main flow into the branch pipe, a patent literature 1 discloses a valve body fitted to a diversion hole provided in a scroll part. Such a valve body is configured such that an inner surface along an inner wall of the scroll part in a closed state is formed.

CITATION LIST

Patent Literature

[PTL 1] International Publication No. WO2012/157598

SUMMARY OF INVENTION

Technical Problem

However, in the configuration of the related art described in PTL 1, it is necessary to design a layout and a shape of the valve body for each specification of a compressor housing (fluid machine), and thereby the configuration is not suitable for mass production.

The present disclosure is devised in view of the problem described above, and an object thereof is to provide a pipe branching device and a compressor that are suitable for mass production.

Solution to Problem

According to an aspect of the present disclosure, in order to achieve the object, there is provided a pipe branching device including:
a main pipe; and a branch pipe that branches off from the main pipe,
in which the main pipe includes a first pipe and a second pipe that is fitted to the first pipe in an axial direction of the first pipe,
a chamber that communicates with the branch pipe is provided between the first pipe and the second pipe, and
a flow channel that communicates with the chamber is provided from an inside of the second pipe.

Advantageous Effects of Invention

With the pipe branching device of the present disclosure, it is not necessary to design a layout and a shape of a valve body for each specification of a fluid machine, and the pipe branching device suitable for mass production can be provided.

DESCRIPTION OF EMBODIMENTS

Figure 1:
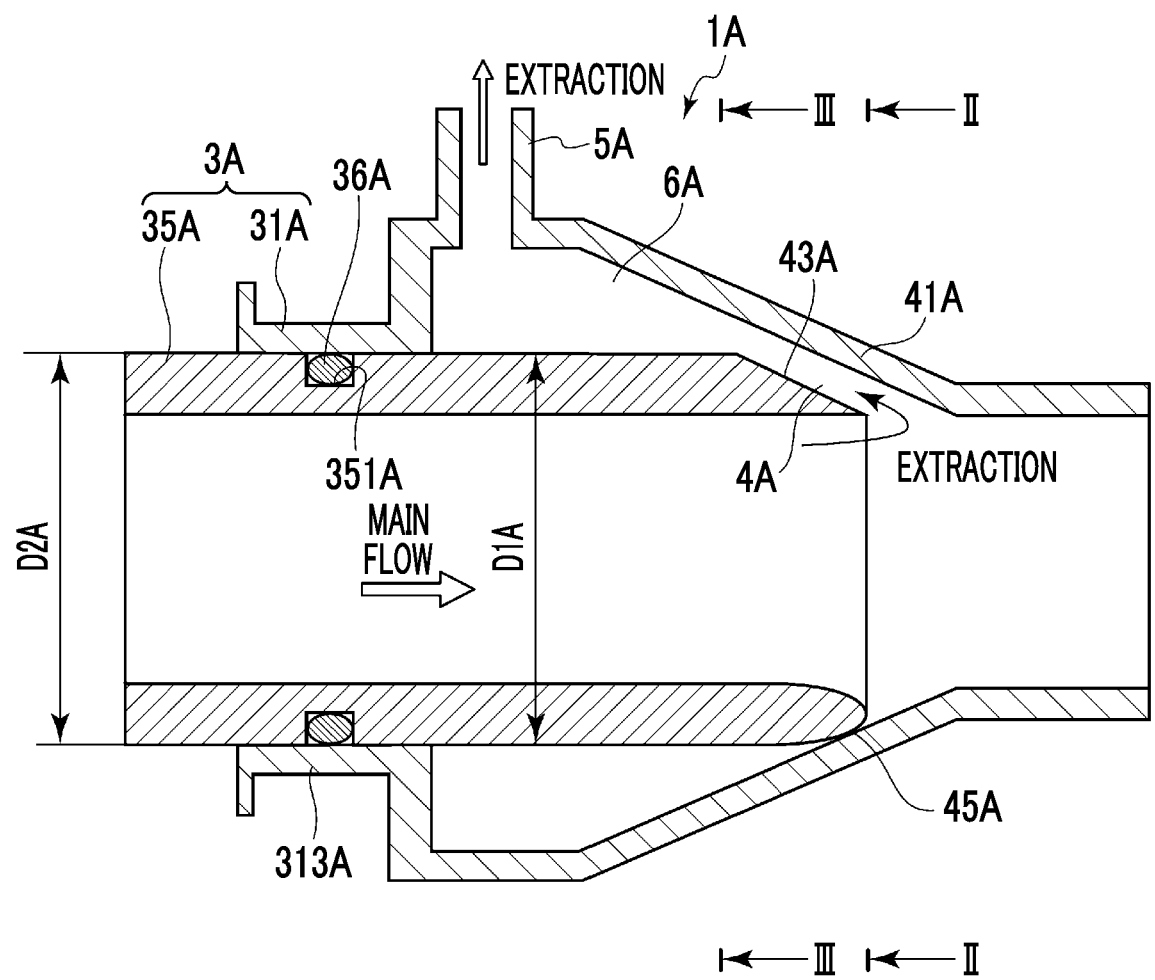
FIG. 1 is a longitudinal sectional view schematically showing a pipe branching device according to embodiment 1.

Hereinafter, a pipe branching device and a compressor according to an embodiment of the present disclosure will be described with reference to the accompanying drawings. However, dimensions, materials, shapes, relative dispositions, and the like of components described in the embodiment or shown in the drawings are not intended to limit the scope of the present invention but are merely explanatory examples.

The pipe branching device according to the embodiment can be adopted for general fluid machines such as a turbo machine and is suitable for, for example, a compressor of a turbocharger as will be described later.

Embodiment 1

Figure 2:
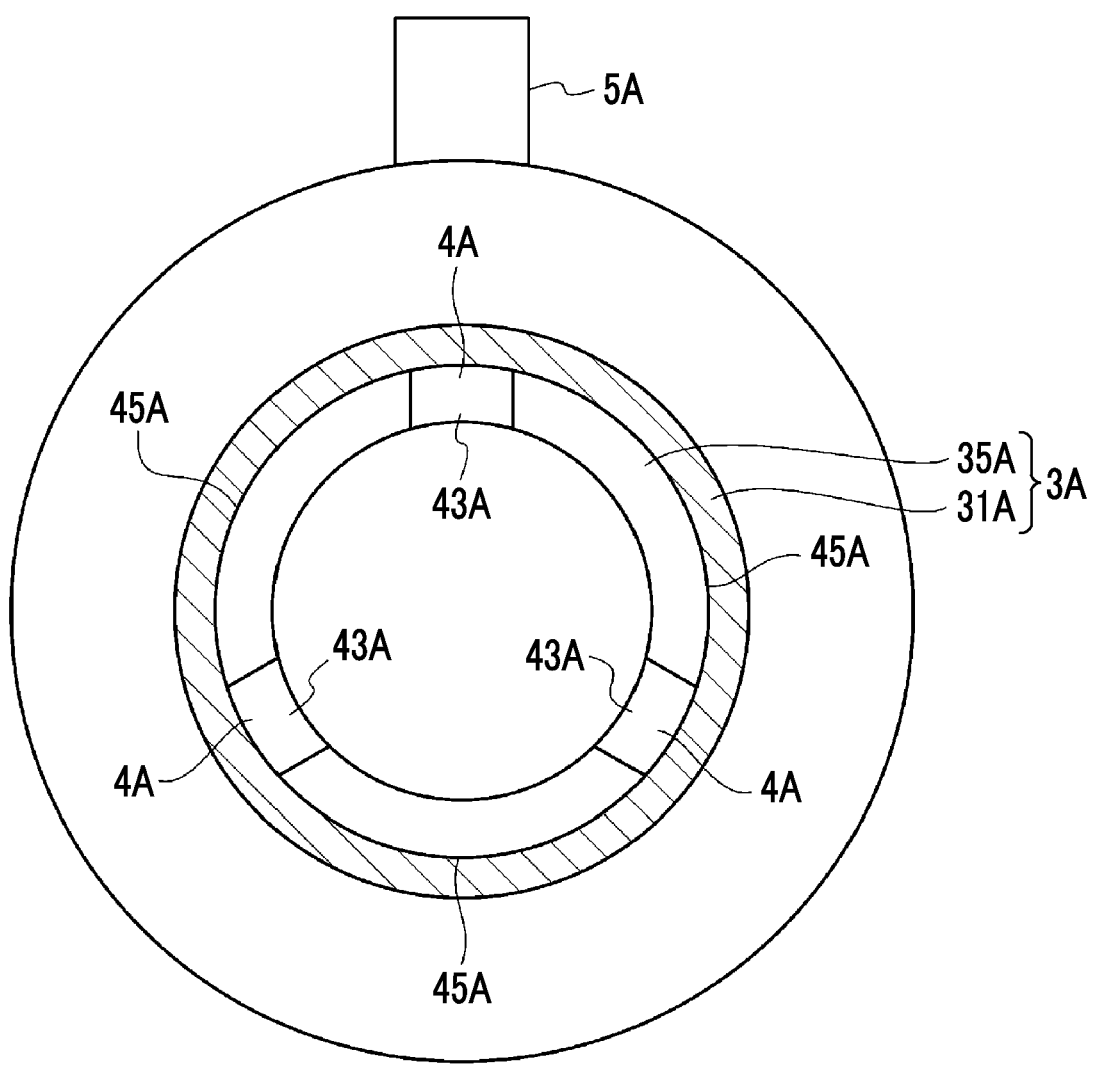
FIG. 2 is a sectional view taken along line II-II of the pipe branching device shown in FIG. 1.
Figure 3:
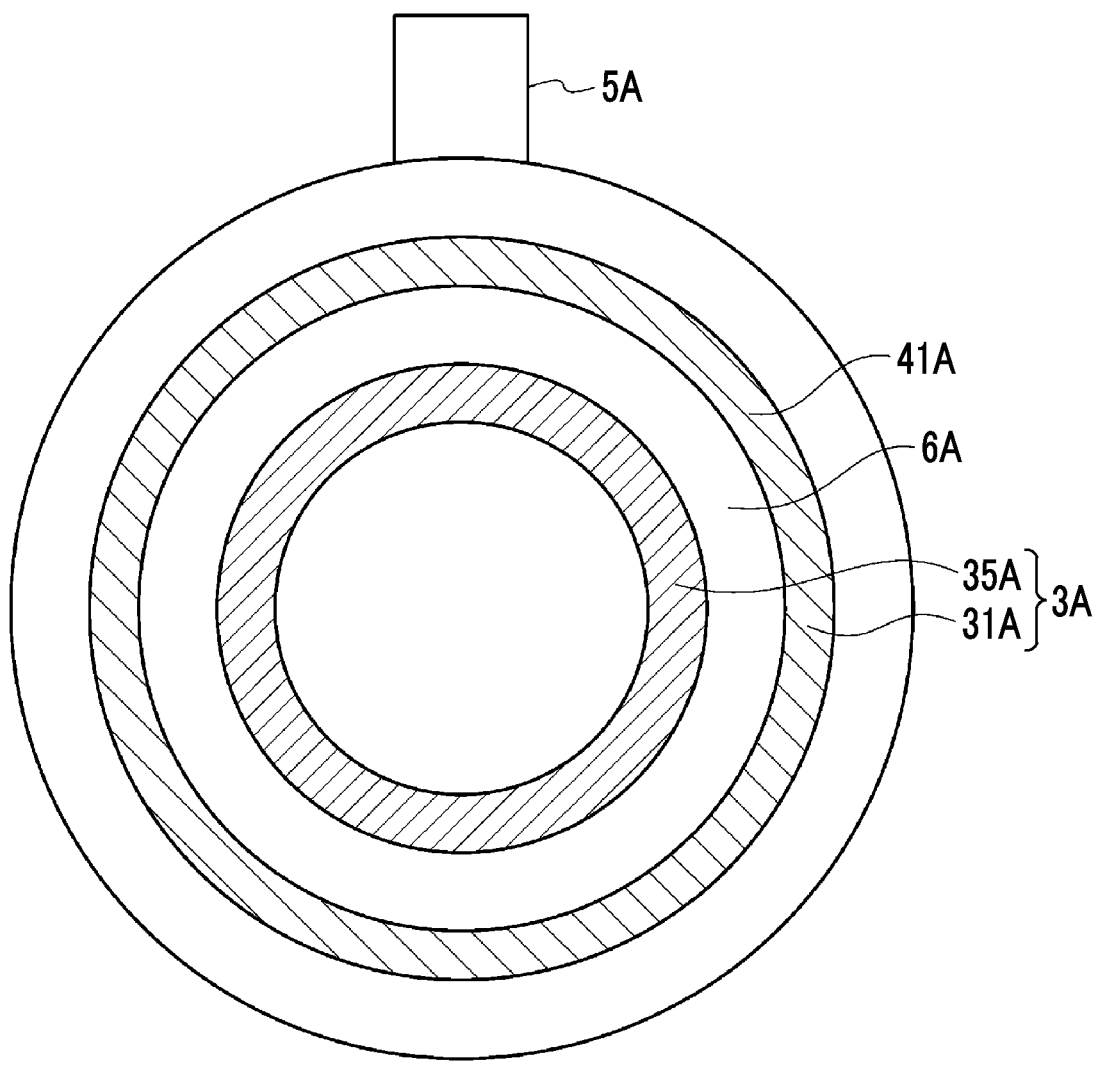
FIG. 3 is a sectional view taken along line III-III of the pipe branching device shown in FIG. 1.

FIG. 1 is a longitudinal sectional view schematically showing a pipe branching device 1A according to embodiment 1. FIG. 2 is a sectional view taken along line II-II of the pipe branching device 1A shown in FIG. 1, and FIG. 3 is a sectional view taken along line III-III of the pipe branching device 1A shown in FIG. 1.

As shown in FIG. 1, the pipe branching device 1A according to embodiment 1 is a pipe branching device including a main pipe 3A and a branch pipe 5A that branches off from the main pipe 3A.

The main pipe 3A includes a first pipe 31A and a second pipe 35A that is fitted to the first pipe 31A in an axial direction of the first pipe 31A. For example, the first pipe 31A and the second pipe 35A are circular pipes, and standard products defined in Japanese Industrial Standards (JIS) can be adopted.

In the example shown in FIG. 1, in a flowing direction of a main flow flowing in the main pipe 3A, the first pipe 31A is disposed on a downstream side, and the second pipe 35A is disposed on an upstream side. In addition, in the example shown in FIG. 1, a ring groove 351A having a rectangular section is provided in the second pipe 35A, and the second pipe 35A and the first pipe 31A are sealed with an O-ring 36A fitted to the ring groove 351A.

A chamber 6A that communicates with the branch pipe 5A is provided between the first pipe 31A and the second pipe 35A, and a flow channel 4A that communicates with the chamber 6A is provided from an inside of the second pipe 35A. The chamber 6A is a space provided between the first pipe 31A and the second pipe 35A and is provided over, for example, the entire outer periphery of the second pipe 35A. With such a configuration, a fluid that has branched off from a main flow flowing in the main pipe 3A flows in the branch pipe 5A through the flow channel 4A and the chamber 6A.

With such a configuration, the pipe branching device 1A suitable for mass production can be provided.

The flow channel 4A is defined by an expansion portion 41A and an inclined portion 43A. The expansion portion 41A is provided at the first pipe 31A and gradually expands toward the second pipe 35A. The inclined portion 43A is provided at an end portion of the second pipe 35A. The thickness of the inclined portion 43A on a pipeline side gradually decreases toward the expansion portion 41A. For example, an inner peripheral surface of the expansion portion 41A is configured by a tapered surface that expands at a constant rate toward the second pipe 35A, and a surface of the inclined portion 43A facing the expansion portion 41A is configured by an inclined surface or a tapered surface that is inclined at a constant rate toward the expansion portion 41A.

With such a configuration, since the flow channel 4A that communicates with the chamber 6A is defined between the inclined portion 43A and the expansion portion 41A, a pressure loss caused by inflow of a main flow into the chamber 6A can be reduced. Thus, as in a valve body fitted to a diversion hole provided in a scroll part, it is not necessary to design a layout and a shape of the valve body for each specification of a fluid machine (for example, a compressor housing), and the pipe branching device 1A suitable for mass production can be provided.

In the pipe branching device 1A according to embodiment 1, a branching position of the branch pipe 5A is provided on the upstream side of the flow channel 4A provided between the inclined portion 43A and the expansion portion 41A in the flowing direction of a main flow flowing in the main pipe 3A.

With such a configuration, a flow of a fluid in the branch pipe 5A for extracting some of the main flow flowing in the main pipe 3A flows back to the main flow at an acute angle. Thus, inflow of the main flow into the chamber 6A can be suppressed, and a pressure loss caused by the inflow of the main flow into the chamber 6A can be reduced.

As shown in FIG. 1, in the pipe branching device 1A according to embodiment 1, the first pipe 31A and the second pipe 35A are circular pipes, a fitting portion 313A to which the second pipe 35A is fitted is provided at an inlet side end portion of the first pipe 31A, and the second pipe 35A and the first pipe 31A are sealed at the fitting portion 313A. Thus, an inner diameter D1A of the fitting portion 313A provided at the inlet side end portion of the first pipe 31A is the same as an outer diameter D2A of a fitting portion provided at an outlet side end portion of the second pipe 35A.

As shown in FIGS. 1 to 3, in the pipe branching device 1A according to embodiment 1, an abutment part 45A that abuts against the expansion portion 41A is provided at a position of the end portion of the second pipe 35A which is different from the inclined portion 43A in a circumferential direction. As shown in FIG. 2, for example, the inclined portion 43A is provided at each of positions that equally divide the end portion of the second pipe 35A in the circumferential direction, and the abutment part 45A is provided in an entire area between the inclined portions 43A. In the example shown in FIG. 2, the inclined portion 43A is provided at each of positions that equally divide the end portion of the second pipe 35A into three parts in the circumferential direction, and the abutment part 45A is provided in the entire area between the inclined portions 43A. A tip portion of the abutment part 45A is formed to have, for example, a cross section having a semi-arc shape.

With such a configuration, as the abutment part 45A abuts against the expansion portion 41A, the flow channel 4A can be provided only between the inclined portion 43A and the expansion portion 41A.

In the pipe branching device 1A according to embodiment 1, a flow channel sectional area of the flow channel 4A is the same as a flow channel sectional area of the branch pipe 5A. For example, as shown in FIG. 2, in a case where the inclined portion 43A is provided at each of the positions that equally divide the end portion of the second pipe 35A into three parts in the circumferential direction and the flow channel 4A is provided between the inclined portion 43A and the expansion portion 41A, a total flow channel sectional area of the three flow channels 4A is the same as the flow channel sectional area of the branch pipe 5A.

With such a configuration, the speed of a fluid extracted from the main pipe 3A to the branch pipe 5A can be made constant.

Figure 4:
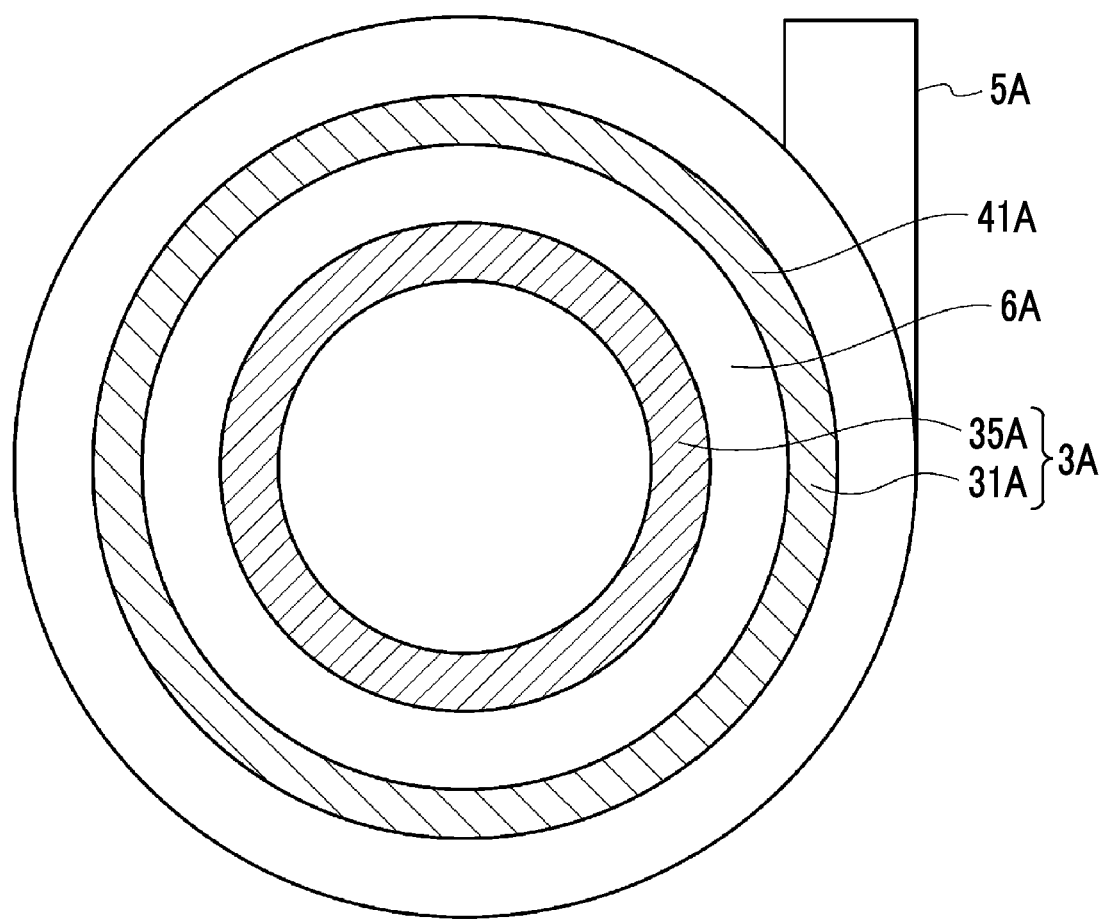
FIG. 4 is a view showing a modification example of a branch pipe of the pipe branching device shown in FIG. 3.

As described above, the branch pipe branches off from the main pipe 3A and extends, for example, to a radial outer side of the main pipe 3A as shown in FIGS. 2 and 3, but may extend, as shown in FIG. 4, in a tangential direction of the chamber 6A that is provided between the first pipe 31A and the second pipe 35A and that is formed in an annular shape.

Figure 5:
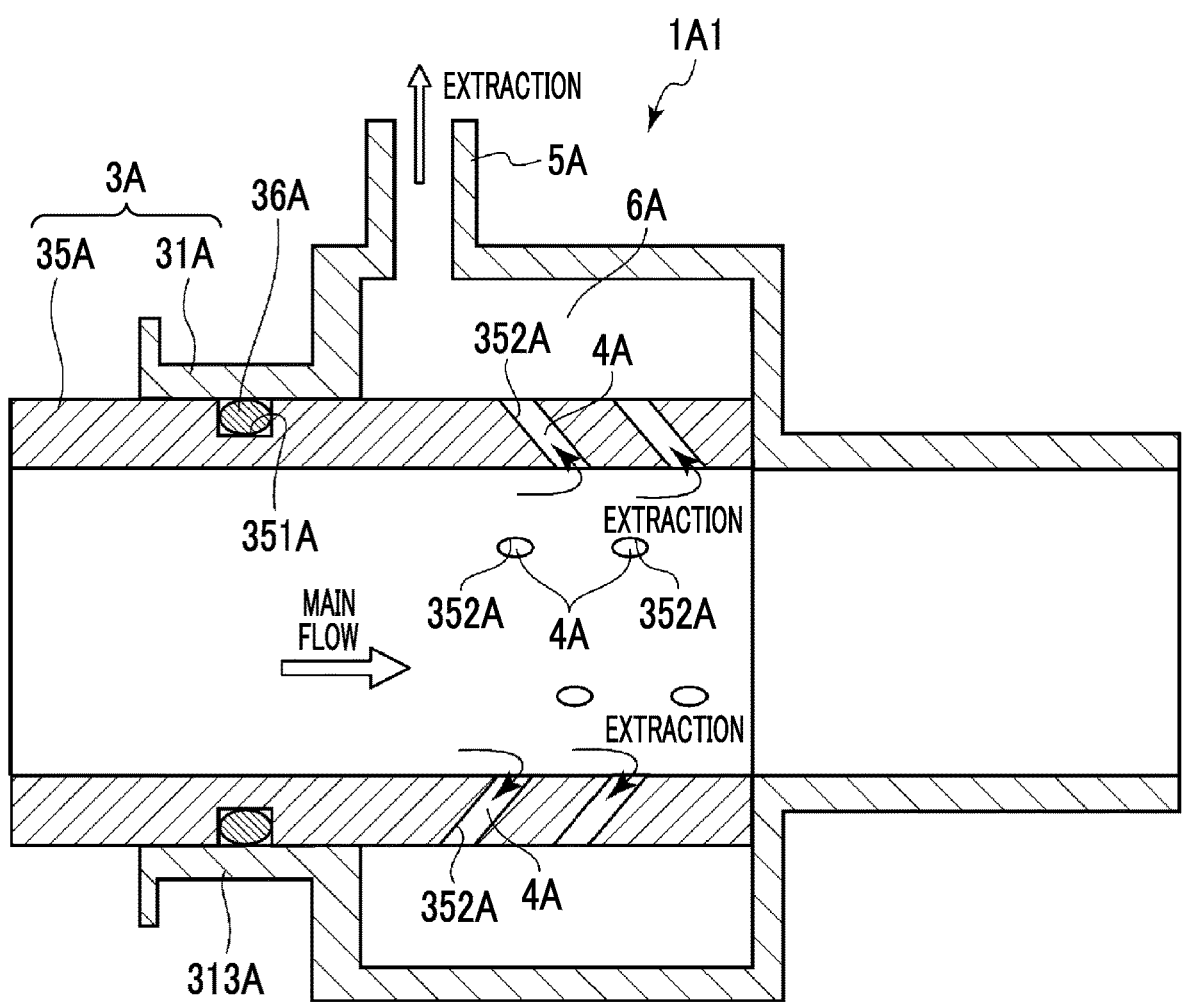
FIG. 5 is a longitudinal sectional view schematically showing modification example 1 of the pipe branching device according to embodiment 1.
Figure 6:
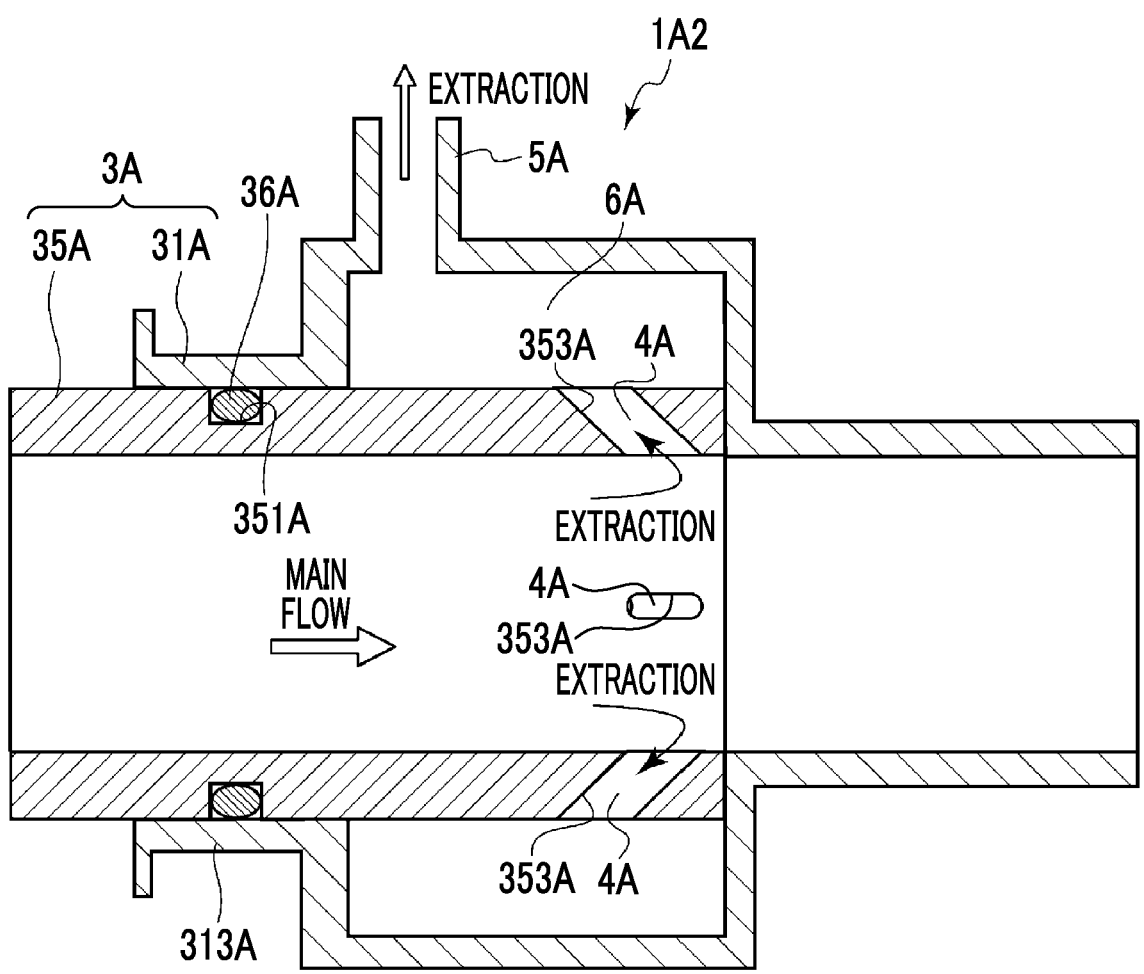
FIG. 6 is a longitudinal sectional view schematically showing modification example 2 of the pipe branching device according to embodiment 1.
Figure 7:
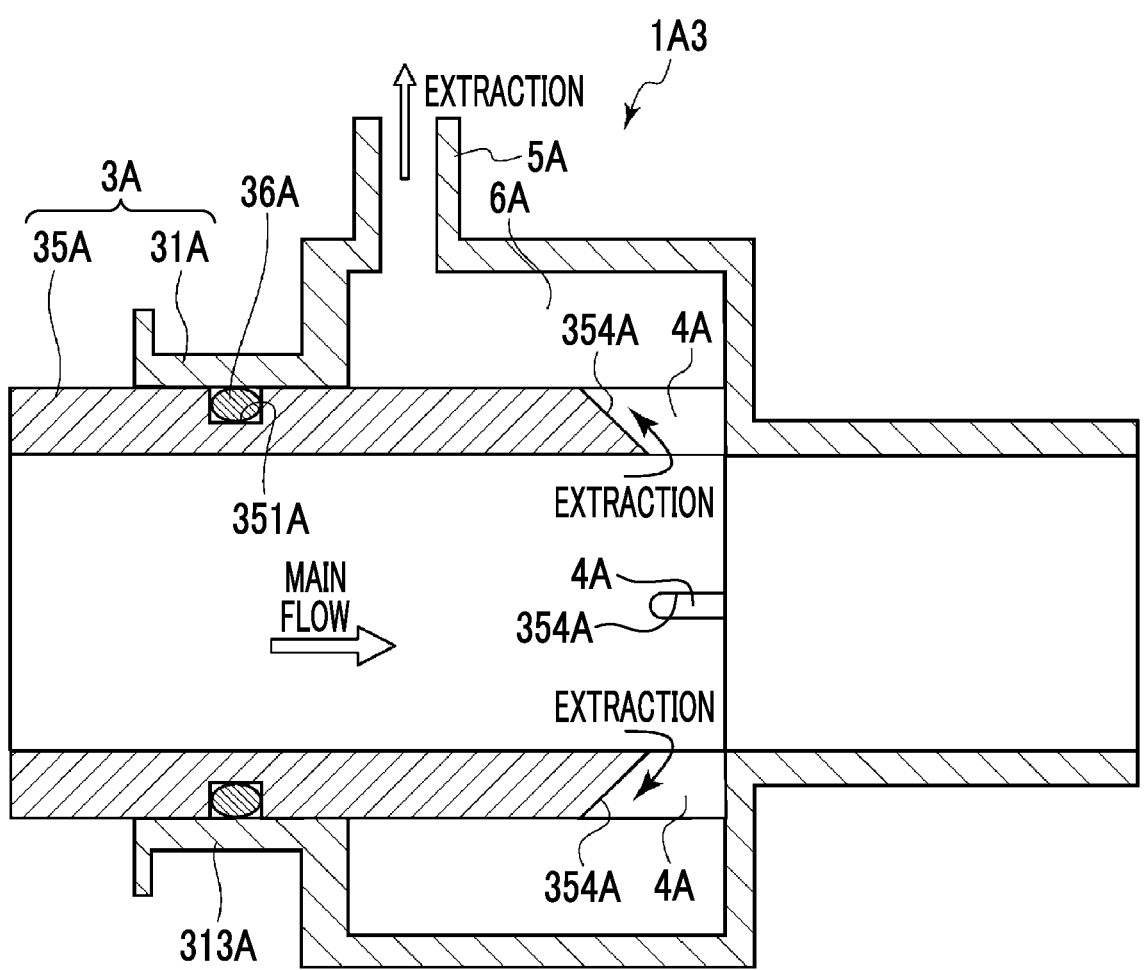
FIG. 7 is a longitudinal sectional view schematically showing modification example 3 of the pipe branching device according to embodiment 1.

FIGS. 5 to 7 are longitudinal sectional views schematically showing pipe branching devices 1A1 to 1A3 according to modification examples of the pipe branching device 1A according to embodiment 1. As shown in FIGS. 5 to 7, the flow channel 4A is a hole 352A, a long hole 353A, or a slit 354A provided in the second pipe 35A.

As shown in FIG. 5, in the pipe branching device 1A1 according to modification example 1, the flow channel 4A is the hole 352A provided in the second pipe 35A. There are one or two or more (plurality of) holes 352A, and the holes 352A are configured by, for example, inclined holes gradually inclined to the downstream side in the flowing direction of a main flow from the radial outer side toward a radial inner side of the second pipe 35A. In a case where there are two or more holes 352A, the holes 352A may be staggered in an axial direction of the second pipe 35A. In addition, although not specifically shown, the holes 352A may be holes provided in one row in the axial direction of the second pipe 35A or may be holes provided in one row (in total, two rows) on each of both sides in a radial direction of the second pipe 35A. With such a configuration, the pipe branching device 1A1 suitable for mass production can be provided.

In addition, in the pipe branching device 1A1 according to modification example 1, the branching position of the branch pipe 5A is provided on the upstream side of the hole 352A provided in the second pipe 35A in the flowing direction of a main flow flowing in the main pipe 3A. With such a configuration, a flow of a fluid in the flow channel 4A for extracting some of the main flow flowing in the main pipe 3A flows back to the main flow. Thus, inflow of the main flow into the flow channel 4A can be suppressed, and a pressure loss caused by the inflow of the main flow into the chamber 6A can be reduced.

As shown in FIG. 6, in the pipe branching device 1A2 according to modification example 2, the flow channel 4A is the long hole 353A provided in the second pipe 35A. There are one or two or more (plurality of) long holes 353A, and the long holes 353A are configured by, for example, inclined holes gradually inclined to the downstream side in the flowing direction of a main flow from the radial outer side toward the radial inner side of the second pipe 35A. In a case where there are two or more long holes 353A, the long holes 353A are provided at positions of the second pipe 35A that equally divide the end portion of the second pipe 35A in the circumferential direction.

In addition, in the pipe branching device 1A2 according to modification example 2, the branching position of the branch pipe 5A is provided on the upstream side of the long hole 353A provided in the second pipe 35A in the flowing direction of a main flow flowing in the main pipe 3A. With such a configuration, a flow of a fluid in the flow channel 4A for extracting some of the main flow flowing in the main pipe 3A flows back to the main flow. Thus, inflow of the main flow into the flow channel 4A can be suppressed, and a pressure loss caused by the inflow of the main flow into the chamber 6A can be reduced.

As shown in FIG. 7, in the pipe branching device 1A3 according to modification example 3, the flow channel 4A is the slit 354A provided in the end portion of the second pipe 35A. There are one or two or more (plurality of) slits 354A, and in a case where there are two or more slits 354A, the slits 354A are provided at, for example, positions of the second pipe 35A that equally divide the end portion of the second pipe 35A in the circumferential direction.

In addition, in the pipe branching device 1A3 according to modification example 3, the branching position of the branch pipe 5A is provided on the upstream side of the slit 354A provided in the second pipe 35A in the flowing direction of a main flow flowing in the main pipe 3A. With such a configuration, a flow of a fluid in the flow channel 4A for extracting some of the main flow flowing in the main pipe 3A flows back to the main flow. Thus, inflow of the main flow into the flow channel 4A can be suppressed, and a pressure loss caused by the inflow of the main flow into the chamber 6A can be reduced.

Figure 8:
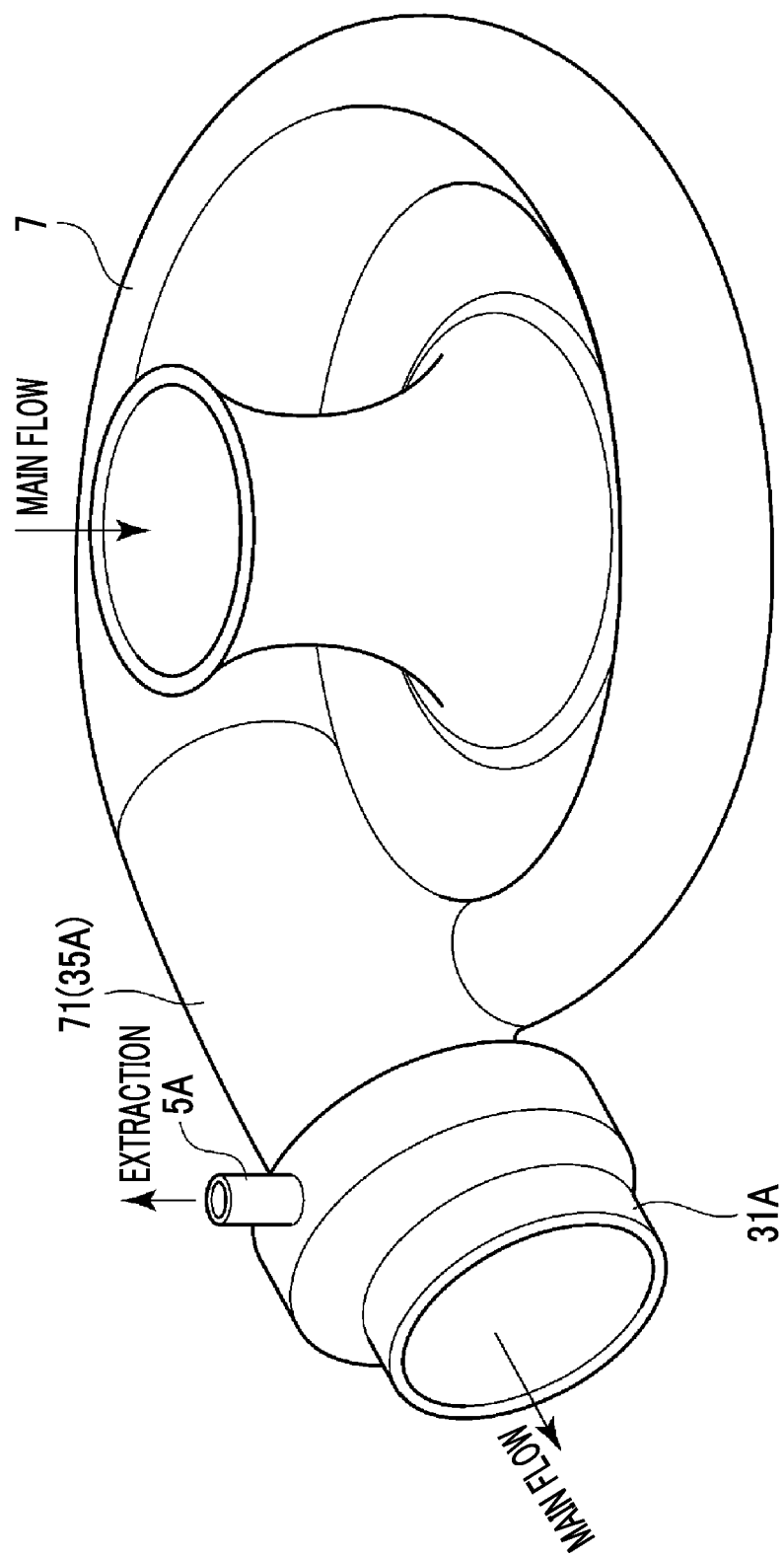
FIG. 8 is a perspective view schematically showing an outer shape of a compressor that has adopted the pipe branching device according to embodiment 1.

FIG. 8 is a perspective view schematically showing an outer shape of a compressor 7 that has adopted the pipe branching device 1A according to embodiment 1.

As shown in FIG. 8, the pipe branching device 1A according to embodiment 1 is provided at, for example, the compressor 7 configuring a turbocharger. In the pipe branching device 1A according to embodiment 1 provided in the compressor 7, the second pipe 35A is an outlet pipe 71, and the branch pipe 5A is the branch pipe 5A through which some of a main flow flowing in the outlet pipe 71 is extracted.

With such a configuration, some of compressed air (main flow) at an outlet of the compressor 7 can be extracted from the flow channel 4A to the branch pipe 5A.

Embodiment 2

Figure 9:
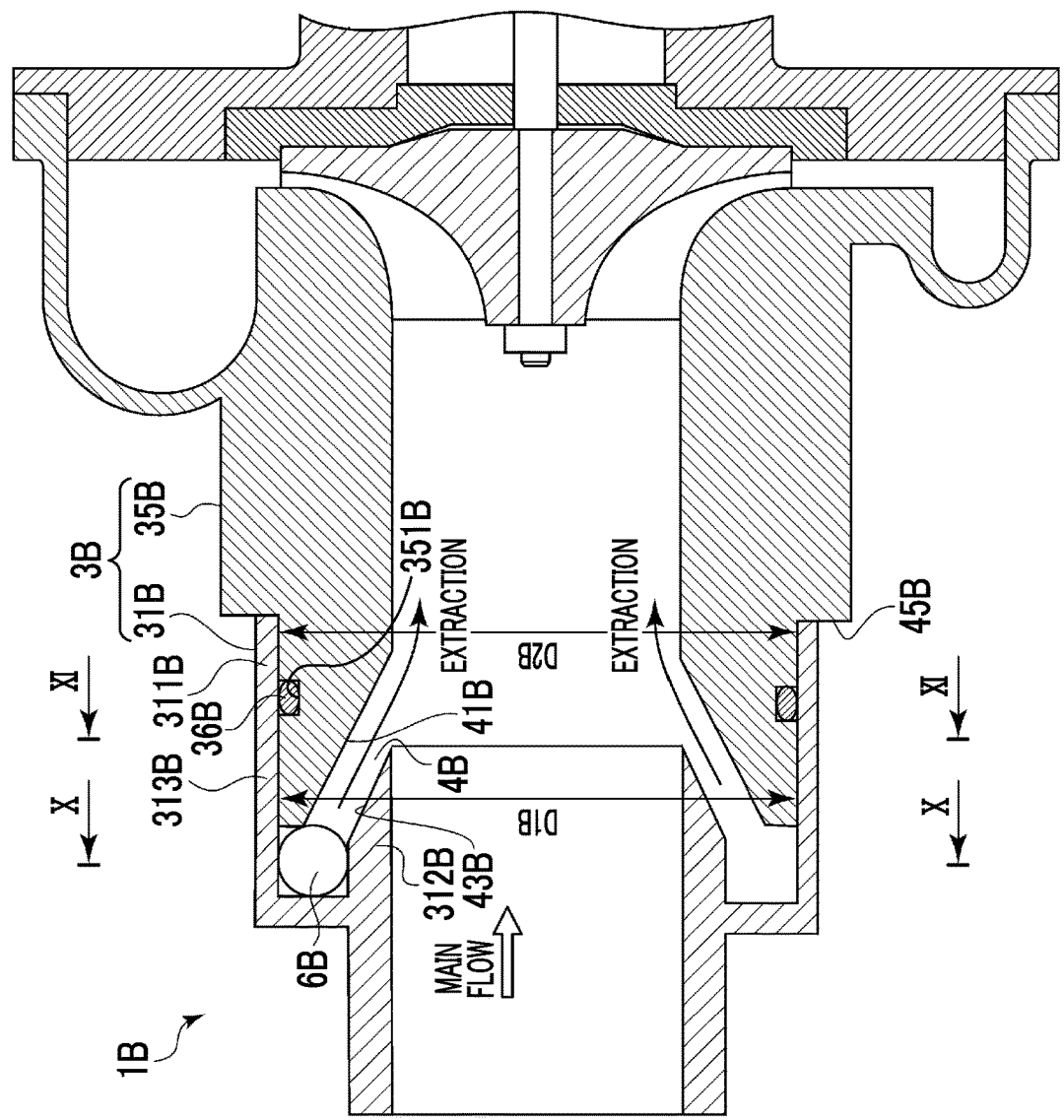
FIG. 9 is a longitudinal sectional view schematically showing a pipe branching device according to embodiment 2.
Figure 10:
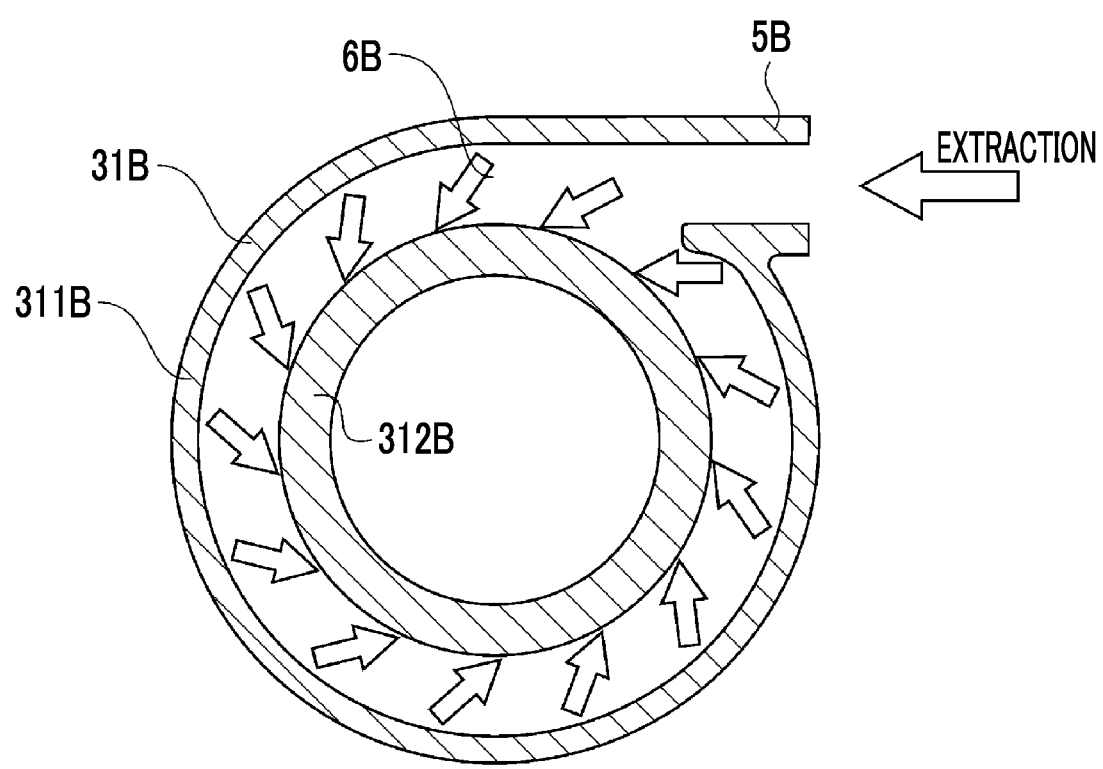
FIG. 10 is a sectional view taken along line X-X of the pipe branching device shown in FIG. 9.
Figure 11:
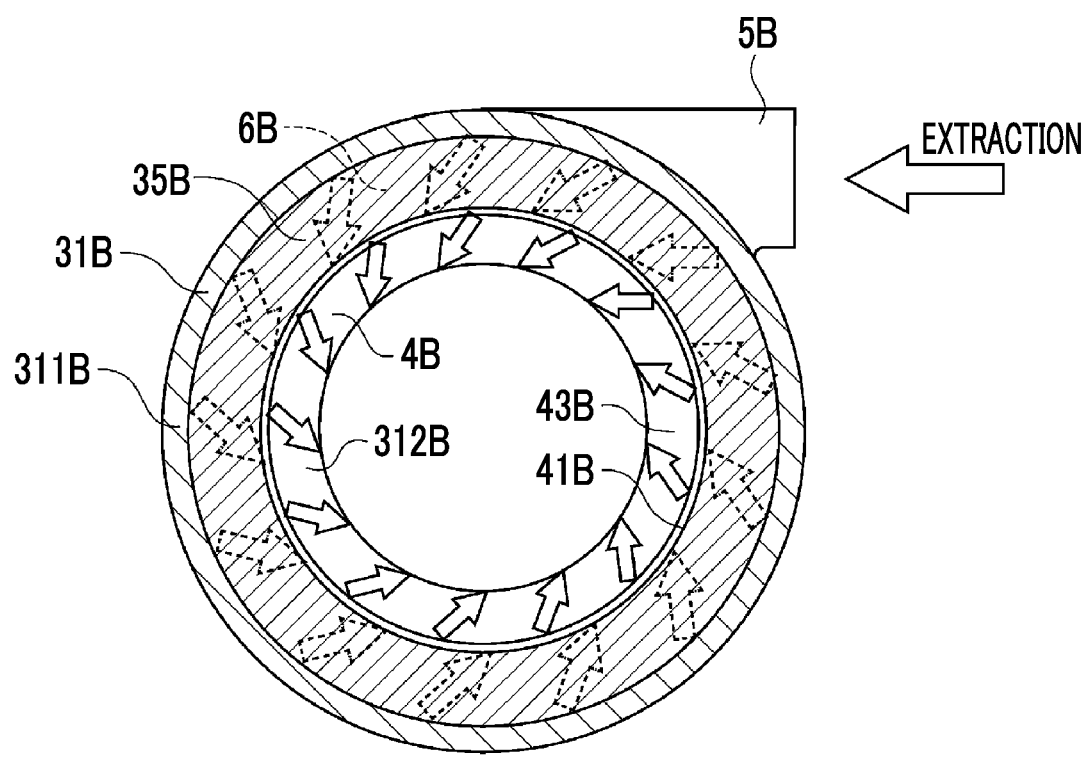
FIG. 11 is a sectional view taken along line XI-XI of the pipe branching device shown in FIG. 9.

FIG. 9 is a longitudinal sectional view schematically showing a pipe branching device 1B according to embodiment 2. FIG. 10 is a sectional view taken along line X-X of the pipe branching device 1B shown in FIG. 9, and FIG. 11 is a sectional view taken along line XI-XI of the pipe branching device 1B shown in FIG. 9.

As shown in FIG. 9, the pipe branching device 1B according to embodiment 2 is the pipe branching device 1B including a main pipe 3B and a branch pipe 5B (see FIG. 10) that branches off from the main pipe 3B.

The main pipe 3B includes a first pipe 31B and a second pipe 35B that is fitted to the first pipe 31B in an axial direction of the first pipe 31B. For example, the first pipe 31B and the second pipe 35B are circular pipes, and standard products defined in Japanese Industrial Standards (JIS) can be adopted.

In the example shown in FIG. 9, in a flowing direction of a main flow flowing in the main pipe 3B, the first pipe 31B is disposed on an upstream side, and the second pipe 35B is disposed on a downstream side. In addition, in the example shown in FIG. 9, a ring groove 351B having a rectangular section is provided in the second pipe 35B, and the second pipe 35B and the first pipe 31B are sealed with an O-ring 36B fitted to the ring groove 351B.

A chamber 6B that communicates with the branch pipe 5B is provided between the first pipe 31B and the second pipe 35B, and a flow channel 4B that communicates with the chamber 6B is provided from an inside of the second pipe 35B. In the example shown in FIG. 9, an outer periphery-side end portion 311B and an inner periphery-side end portion 312B are provided at an end portion of the first pipe 31B, and the chamber 6B is provided between the outer periphery-side end portion 311B and the inner periphery-side end portion 312B. The outer periphery-side end portion 311B and the inner periphery-side end portion 312B are double pipes provided about the same axis, and the flow channel 4B is provided at the inner periphery-side end portion 312B. With such a configuration, a fluid flowing in the branch pipe 5B passes through the chamber 6B and the flow channel and merges into a main flow flowing in the main pipe 3B.

With such a configuration, the pipe branching device 1B suitable for mass production can be provided.

The flow channel 4B is defined by an expansion portion 41B and an inclined portion 43B. The expansion portion 41B is provided at the second pipe 35B and gradually expands toward the first pipe 31B. The inclined portion 43B is provided at the inner periphery-side end portion 312B of the first pipe 31B. The thickness of the inclined portion 43B on the pipeline side gradually decreases toward the expansion portion 41B. For example, an inner peripheral surface of the expansion portion 41B is configured by a tapered surface that expands at a constant rate toward the first pipe 31B, and a surface of the inclined portion 43B facing the expansion portion 41B is configured by an inclined surface or a tapered surface that is inclined at a constant rate toward the expansion portion 41B.

With such a configuration, since the flow channel 4B that communicates with the chamber 6B is defined between the inclined portion 43B and the expansion portion 41B, interference of a flow when a fluid flowing in the chamber 6B merges into a main flow flowing in the main pipe 3B can be decreased. In addition, it is not necessary to design a layout and a shape of the branch pipe 5B for each specification of a fluid machine (for example, a compressor housing), and the pipe branching device 1B suitable for mass production can be provided.

In the pipe branching device 1B according to embodiment 2, a branching position of the branch pipe 5B is provided on the upstream side of the flow channel 4B provided between the inclined portion 43B and the expansion portion 41B in the flowing direction of a main flow flowing in the main pipe 3B.

With such a configuration, a flow of a fluid in the branch pipe 5B for merging into the main flow flowing in the main pipe 3B merges into the main flow at an acute angle. Thus, it becomes difficult for the flow of the fluid in the branch pipe 5B to interfere with a flow of the main flow, and a decrease in efficiency can be suppressed.

In the pipe branching device 1B according to embodiment 2, the first pipe 31B and the second pipe 35B are circular pipes, a fitting portion 313B to which the second pipe 35B is fitted is provided at the outer periphery-side end portion 311B of the first pipe 31B, and the second pipe 35B and the first pipe 31B are sealed at the fitting portion 313B. Thus, an inner diameter D1B of the fitting portion 313B provided at the inlet side end portion of the first pipe 31B is the same as an outer diameter D2B of the second pipe 35B.

As shown in FIG. 11, in the pipe branching device 1B according to embodiment 2, the inclined portion 43B is provided on the entire periphery of the inner periphery-side end portion 312B in the circumferential direction. As shown in FIG. 9, the surface of the inclined portion 43B facing the expansion portion 41B is configured by a tapered surface that is inclined at a constant rate toward the expansion portion 41B, and the flow channel 4B is defined over the entire periphery of the inner periphery-side end portion 312B in the circumferential direction. In the example shown in FIG. 9, the inclined portion 43B is provided at the inner periphery-side end portion 312B of the first pipe 31B, and the second pipe 35B is fitted to the outer periphery-side end portion 311B. As the outer periphery-side end portion 311B of the first pipe 31B abuts against an abutment part 45B provided at an outer periphery of the second pipe 35B, the flow channel 4B is defined between the expansion portion 41B and the inclined portion 43B.

With such a configuration, the flow channel 4B is defined over the entire periphery of the end portion in the circumferential direction.

Figure 12:
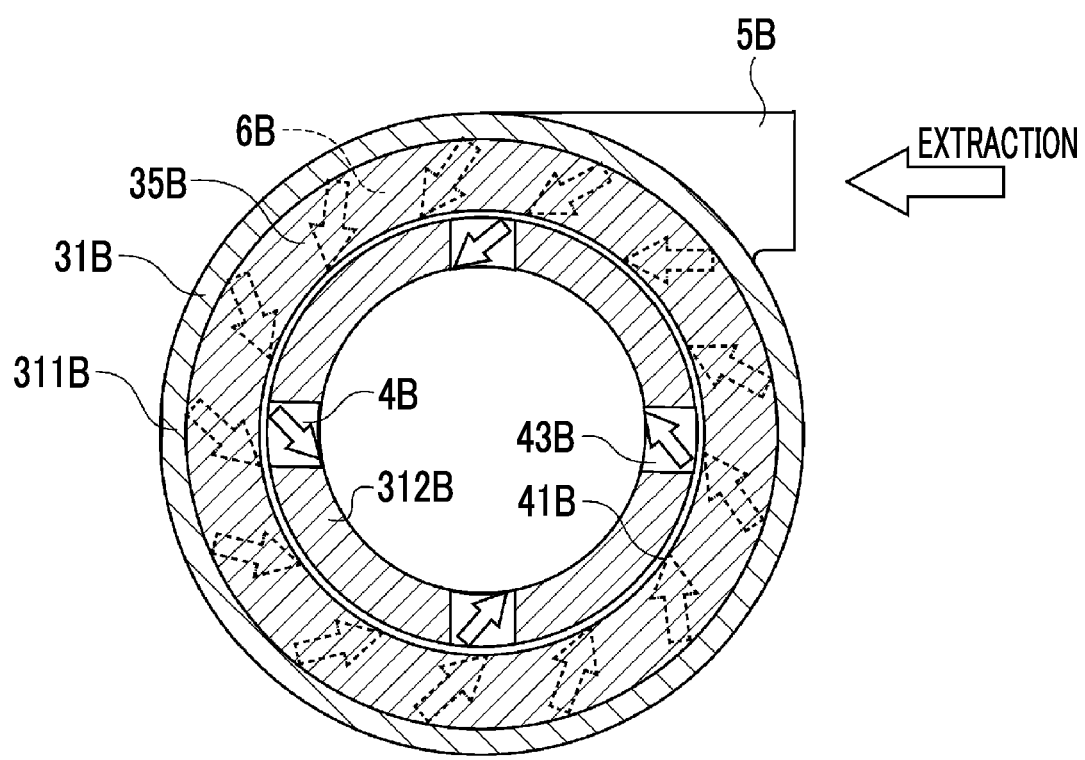
FIG. 12 is a view showing a modification example of a flow channel of the pipe branching device shown in FIG. 9.

As shown in FIG. 12, in the pipe branching device 1B according to embodiment 2, a plurality of inclined portions 43B may be provided at the inner periphery-side end portion 312B in the circumferential direction. The surface of the inclined portion 43B facing the expansion portion 41B is configured by a tapered surface that is inclined at a constant rate toward the expansion portion 41B, and the flow channel 4B is defined at an equal interval with the inner periphery-side end portion 312B in the circumferential direction. In the example shown in FIG. 12, four inclined portions 43B are provided at equal intervals at the inner periphery-side end portion 312B of the first pipe 31B, and the second pipe 35B is fitted to the outer periphery-side end portion 311B. As the outer periphery-side end portion 311B of the first pipe 31B abuts against the abutment part 45B provided at the outer periphery of the second pipe 35B, the flow channel 4B is defined between the expansion portion 41B and the inclined portion 43B.

Figure 13:
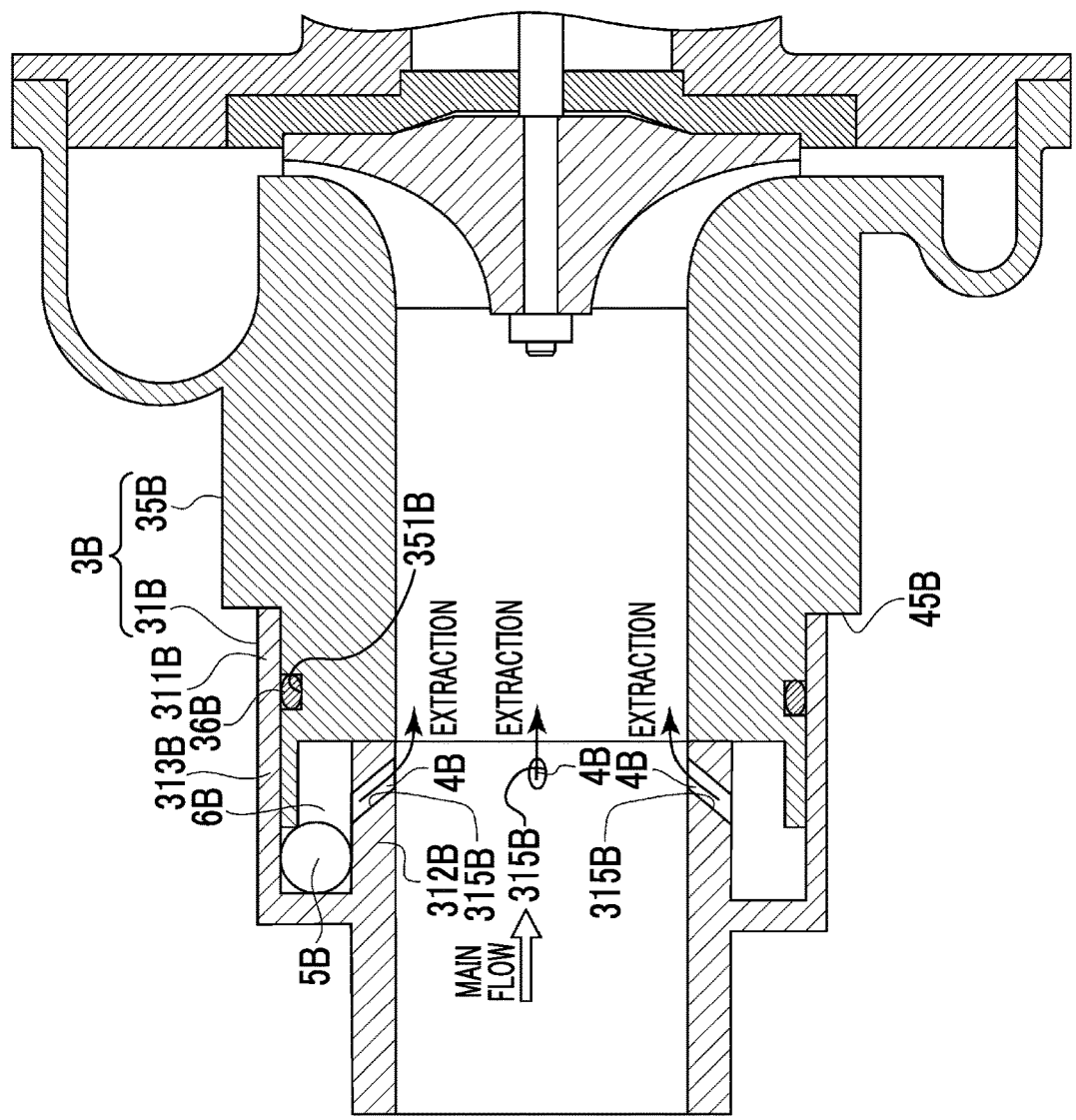
FIG. 13 is a longitudinal sectional view schematically showing modification example 1 of the pipe branching device according to embodiment 2.
Figure 14:
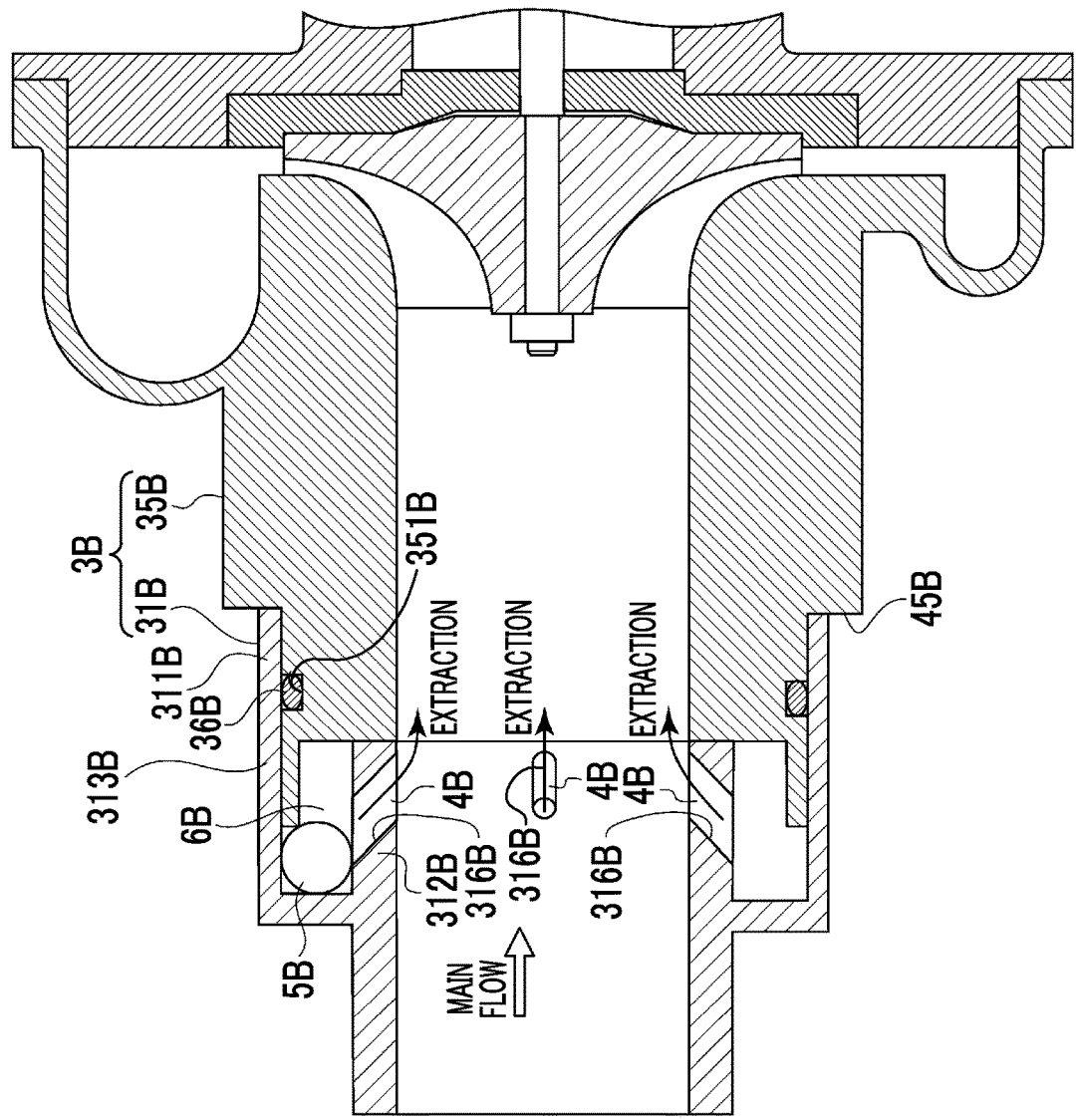
FIG. 14 is a longitudinal sectional view schematically showing modification example 2 of the pipe branching device according to embodiment 2.
Figure 15:
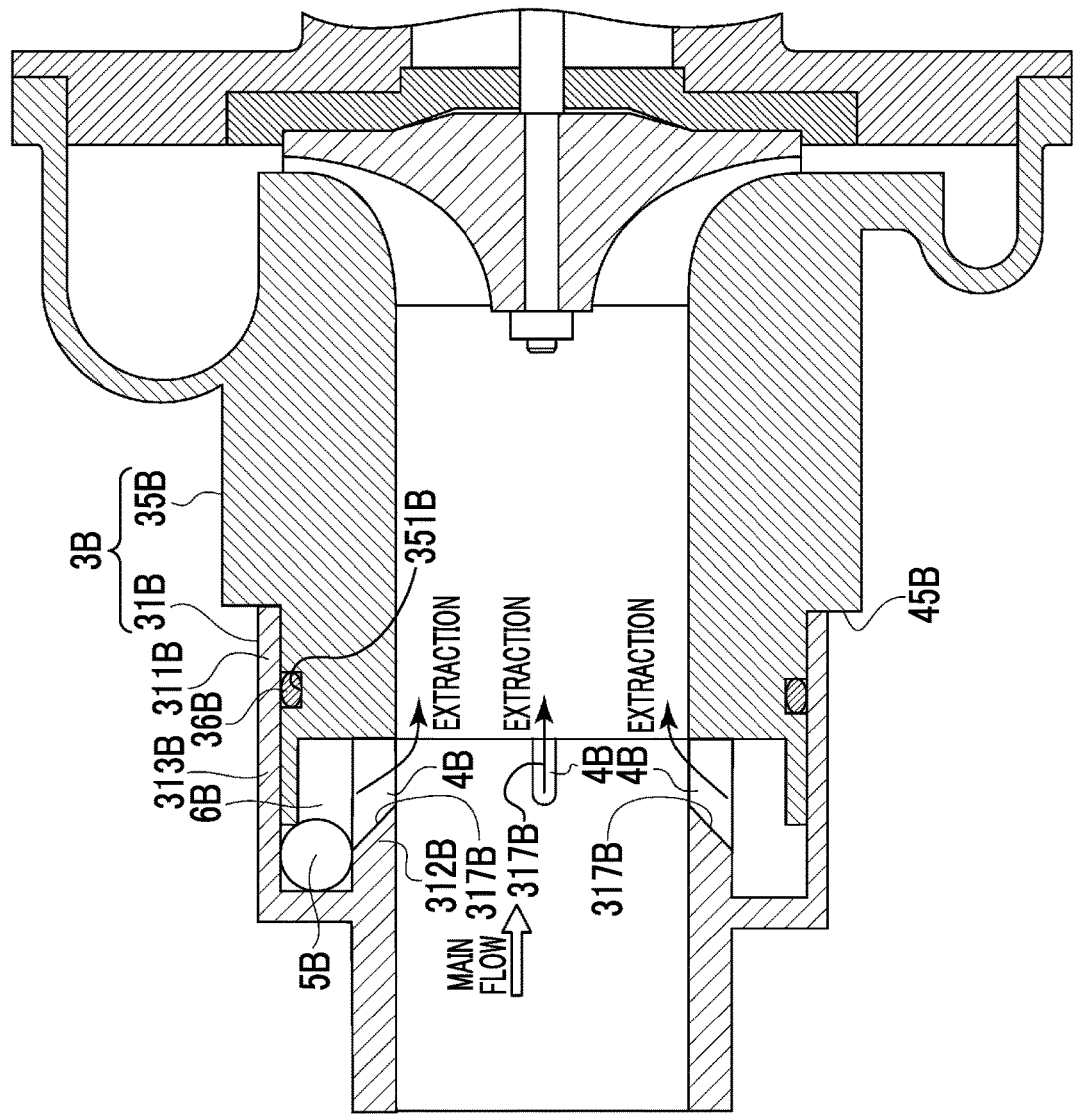
FIG. 15 is a longitudinal sectional view schematically showing modification example 3 of the pipe branching device according to embodiment 2.

FIGS. 13 to 15 are longitudinal sectional views schematically showing pipe branching devices 1B1 to 1B3 according to modification examples of the pipe branching device 1B according to embodiment 2. As shown in FIGS. 13 to 15, the flow channel 4B is a hole 315B, a long hole 316B, or a slit 317B provided in the inner periphery-side end portion 312B of the first pipe 31B.

As shown in FIG. 13, in the pipe branching device 1B1 according to modification example 1, the flow channel 4B is the hole 315B provided in the inner periphery-side end portion 312B of the first pipe 31B. There are one or two or more (plurality of) holes 315B, and the holes 315B are configured by, for example, inclined holes gradually inclined to the downstream side in the flowing direction of a main flow from the radial outer side toward the radial inner side of the inner periphery-side end portion 312B of the first pipe 31B. In a case where there are two or more holes 315B, the holes 315B may be staggered in the axial direction of the first pipe 31B (inner periphery-side end portion 312B). In addition, although not specifically shown, the holes 315B may be holes provided in one row in the axial direction of the first pipe 31B (inner periphery-side end portion 312B) or may be holes provided in one row (in total, two rows) on each of both sides in the radial direction of the first pipe 31B (inner periphery-side end portion 312B). With such a configuration, the pipe branching device 1B1 suitable for mass production can be provided.

In addition, in the pipe branching device 1B1 according to modification example 1, the branching position of the branch pipe 5B is provided on the upstream side of the hole 315B provided in the first pipe 31B (inner periphery-side end portion 312B) in the flowing direction of a main flow flowing in the main pipe 3B. With such a configuration, a flow of a fluid in the flow channel 4B for merging into the main flow flowing in the main pipe 3B merges into the main flow at an acute angle. Thus, it becomes difficult for the flow of the fluid in the flow channel 4B to interfere with the flow of the main flow, and a decrease in efficiency can be suppressed.

As shown in FIG. 14, in the pipe branching device 1B2 according to modification example 2, the flow channel 4B is the long hole 316B provided in the inner periphery-side end portion 312B of the first pipe 31B. There are one or two or more (plurality of) long holes 316B, and the long holes 316B are configured by, for example, inclined holes gradually inclined to the downstream side in the flowing direction of a main flow from the radial outer side toward the radial inner side of the inner periphery-side end portion 312B of the first pipe 31B. In a case where there are two or more long holes 316B, the long holes 316B are provided at positions of the inner periphery-side end portion 312B of the first pipe 31B that equally divide the inner periphery-side end portion 312B in the circumferential direction.

In addition, in the pipe branching device 1B2 according to modification example 2, the branching position of the branch pipe 5B is provided on the upstream side of the long hole 316B provided in the inner periphery-side end portion 312B of the first pipe 31B in the flowing direction of a main flow flowing in the main pipe 3B. With such a configuration, a flow of a fluid in the flow channel 4B for merging into the main flow flowing in the main pipe 3B merges into the main flow at an acute angle. Thus, it becomes difficult for the flow of the fluid in the flow channel 4B to interfere with the flow of the main flow, and a decrease in efficiency can be suppressed.

As shown in FIG. 15, in the pipe branching device 1B3 according to modification example 3, the flow channel 4B is the slit 317B provided in the inner periphery-side end portion 312B of the first pipe 31B. There are one or two or more (plurality of) slits 317B, and in a case where there are two or more slits 317B, the slits 317B are provided at, for example, positions of the inner periphery-side end portion 312B of the first pipe 31B that equally divide the inner periphery-side end portion 312B in the circumferential direction.

In addition, in the pipe branching device 1B3 according to modification example 3, the branching position of the branch pipe 5B is provided on the upstream side of the slit 317B provided in the inner periphery-side end portion 312B of the first pipe 31B in the flowing direction of a main flow flowing in the main pipe 3B. With such a configuration, a flow of a fluid in the flow channel 4B for merging into the main flow flowing in the main pipe 3B merges into the main flow at an acute angle. Thus, it becomes difficult for the flow of the fluid in the flow channel 4B to interfere with the flow of the main flow, and a decrease in efficiency can be suppressed.

Figure 16:
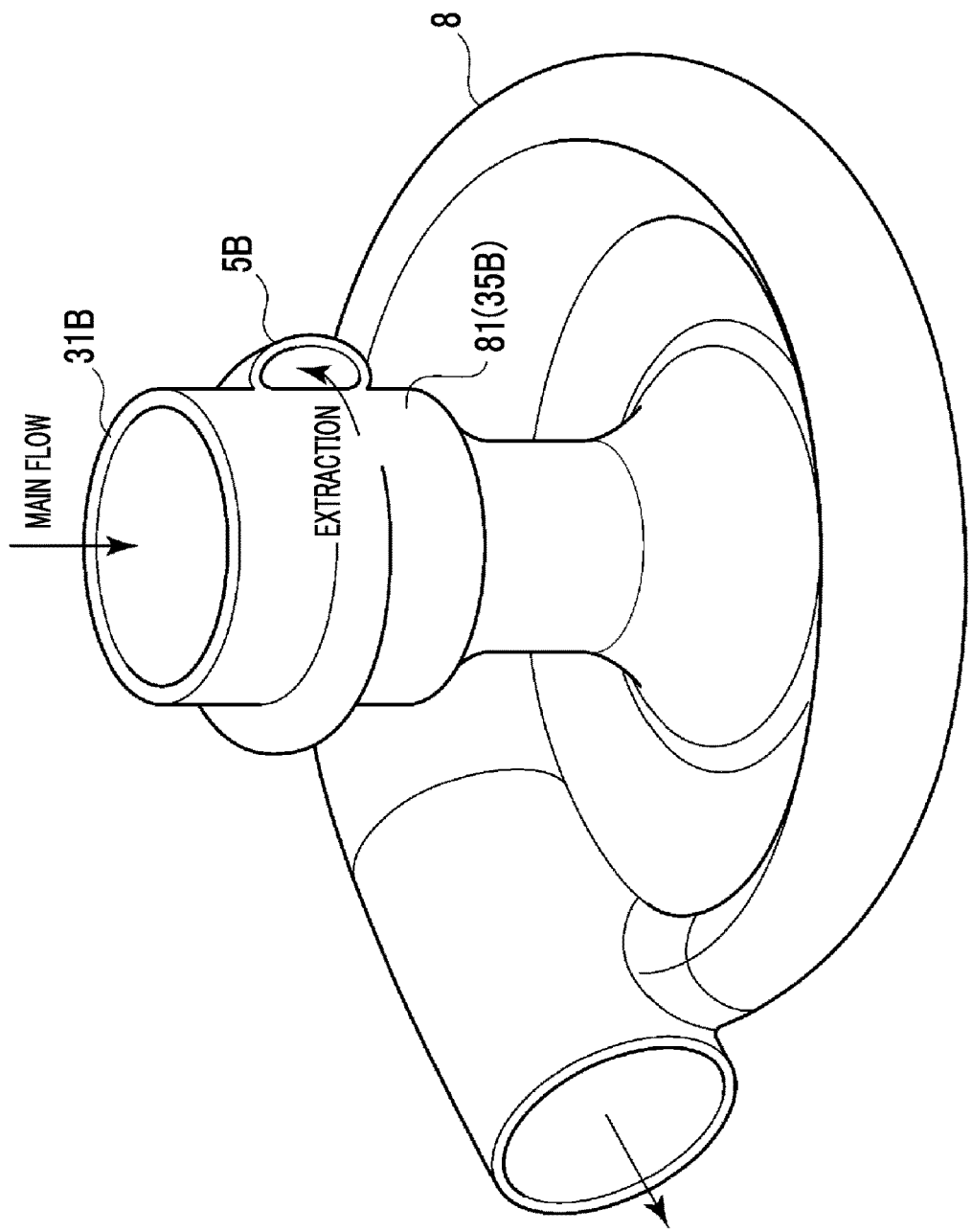
FIG. 16 is a perspective view schematically showing an outer shape of a compressor that has adopted the pipe branching device according to embodiment 2.

FIG. 16 is a view schematically showing an outer shape of a compressor 8 that has adopted the pipe branching device 1B according to embodiment 2.

As shown in FIG. 16, the pipe branching device 1B according to embodiment 2 is provided at, for example, the compressor 8 configuring a turbocharger. In the pipe branching device 1B according to embodiment 2 provided in the compressor 8, the second pipe 35B is an inlet pipe 81, and the branch pipe 5B is a merging pipe in which a fluid merging into a main flow flowing in the inlet pipe 81 flows.

With such a configuration, a gas at an inlet of the compressor 8 can be merged into the main flow.

The present invention is not limited to the embodiments described above and also includes forms obtained by adding modifications to the embodiments described above or forms obtained by combining the forms as appropriate.

The contents described in each of the embodiments described above are understood, for example, as follows.

A pipe branching device (1A, 1B) according to an aspect of [1], the pipe branching device (1A, 1B) including a main pipe (3A, 3B) and a branch pipe (5A, 5B) that branches off from the main pipe (3A, 3B),
in which the main pipe (3A, 3B) includes a first pipe (31A, 31B) and a second pipe (35A, 35B) that is fitted to the first pipe (31A, 31B) in an axial direction of the first pipe (31A, 31B),
a chamber (6A, 6B) that communicates with the branch pipe (5A, 5B) is provided between the first pipe (31A, 31B) and the second pipe (35A, 35B), and
a flow channel (4A, 4B) that communicates with the chamber (6A, 6B) is provided from an inside of the second pipe (35A, 35B).

With such a configuration, the pipe branching device (1A, 1B) suitable for mass production can be provided.

[2] The pipe branching device (1A, 1B) according to another aspect is the pipe branching device (1A, 1B) according to [1],
in which the flow channel (4A, 4B) is defined by
an expansion portion (41A, 41B) that is provided at any one of the first pipe (31A, 31B) and the second pipe (35A, 35B) and that gradually expands toward the other, and
an inclined portion (43A, 43B) that is provided at an end portion of the other of the first pipe (31A, 31B) and the second pipe (35A, 35B) and that has a thickness gradually decreasing toward the expansion portion (41A, 41B).

With such a configuration, since the flow channel (4A, 4B) is defined by the inclined portion (43A, 43B) and the expansion portion (41A, 41B), a pressure loss caused by inflow of a main flow into the branch pipe (5A, 5B) can be reduced. Thus, as in a valve body fitted to a diversion hole provided in a scroll part, it is not necessary to design a layout and a shape of the valve body for each specification of a fluid machine (for example, a compressor housing), and the pipe branching device (1A, 1B) suitable for mass production can be provided.

[3] The pipe branching device (1A, 1B) according to still another aspect is the pipe branching device (1A, 1B) according to [2],
in which a branching position of the branch pipe (5A, 5B) is provided on an upstream side of the flow channel (4A, 4B) in a flowing direction of a main flow flowing in the main pipe (3A, 3B).

With such a configuration, a flow of a fluid into the branch pipe (5A) for extracting some of the main flow flowing in the main pipe (3A) flows back to the main flow at an acute angle. Thus, inflow of the main flow into the branch pipe (5A) can be suppressed, and a pressure loss caused by the inflow of the main flow into the branch pipe (5A) can be reduced. In addition, a flow of a fluid in the branch pipe (5B) for merging into the main flow flowing in the main pipe (3B) merges into the main flow at an acute angle. Thus, it becomes difficult for the flow of the fluid in the branch pipe (5B) to interfere with the flow of the main flow, and a decrease in efficiency can be suppressed.

[4] The pipe branching device (1A) according to still another aspect is the pipe branching device (1A) according to [2] or [3],
in which an abutment part (45A) that abuts against the expansion portion (41A) is provided at a position of the end portion which is different from the inclined portion (43A) in a circumferential direction.

With such a configuration, as the abutment part (45A) abuts against the expansion portion (41A), the flow channel (4A) can be provided only between the inclined portion (43A) and the expansion portion (41A).

[5] The pipe branching device (1B) according to still another aspect is the pipe branching device (1B) according to any one of [1] to [4],
in which the inclined portion (43B) is provided on an entire periphery of the end portion in a circumferential direction.

With such a configuration, the flow channel (4B) is defined over the entire periphery of the end portion in the circumferential direction.

[6] The pipe branching device (1A, 1B) according to still another aspect is the pipe branching device (1A, 1B) according to any one of [1] to [5],
in which a flow channel sectional area of the flow channel (4A, 4B) is the same as a flow channel sectional area of the branch pipe (5A, 5B).

With such a configuration, a speed of a fluid extracted from the main pipe (3A, 3B) to the branch pipe (5A, 5B) can be made constant, and a speed of the fluid merging from the branch pipe (5A, 5B) to the main pipe (3A, 3B) can be made constant.

[7] The pipe branching device (1A1, 1A2, 1A3) according to still another aspect is the pipe branching device (1A) according to [1],
in which the flow channel (4A) is a hole (352A), a long hole (353A), or a slit (354A) provided in the second pipe (35A).

With such a configuration, the pipe branching device (1A1, 1A2, 1A3) suitable for mass production can be provided.

[8] The pipe branching device (1B1, 1B2, 1B3) according to still another aspect is the pipe branching device (1B) according to [1],
in which the first pipe (31B) has
an outer periphery-side end portion (311B) that is provided on an outer side of the second pipe (35B) and to which the second pipe (35B) is fitted, and
an inner periphery-side end portion (312B) that is provided on an inner side of the second pipe (35B) and that configures a double pipe together with the outer periphery-side end portion (311B), and
the flow channel (4B) is a hole (315B), a long hole (316B), or a slit (317B) provided in the inner periphery-side end portion (312B).

With such a configuration, the pipe branching device (1B1, 1B2, 1B3) suitable for mass production can be provided.

A compressor (7) according to [9] including the pipe branching device (1A, 1A1, 1A2, 1A3) according to any one of [1] to [7],
in which the second pipe (35A) is an outlet pipe (71).

With such a configuration, some of compressed air at an outlet can be extracted from the flow channel (4A) to the branch pipe (5A).

A compressor (8) according to [10] including the pipe branching device (1B, 1B1, 1B2, 1B3) according to any one of [1] to [6] or [8],
in which the second pipe (35B) is an inlet pipe (81).

With such a configuration, a gas at an inlet can be merged into the main flow.

REFERENCE SIGNS LIST 1A, 1B pipe branching device
3A, 3B main pipe
31A, 31B first pipe
311B outer periphery-side end portion
312B inner periphery-side end portion
313A, 313B fitting portion
315B hole
316B long hole
317B slit
35A, 35B second pipe
351A, 351B ring groove
352A hole
353A long hole
354A slit
36A, 36B O-ring
4A, 4B flow channel
41A, 41B expansion portion
43A, 43B inclined portion
45A, 45B abutment part
5A, 5B branch pipe
6A, 6B chamber
7 compressor
71 outlet pipe
8 compressor
81 inlet pipe

The invention claimed is:

1. A pipe branching device comprising:
a main pipe; and
a branch pipe that branches off from the main pipe,
wherein the main pipe includes a first pipe and a second pipe that is fitted to the first pipe in an axial direction of the first pipe,
a chamber that communicates with the branch pipe is provided between the first pipe and the second pipe, and
a flow channel that communicates with the chamber is provided from an inside of the second pipe,
wherein the flow channel is defined by
an expansion portion that is provided at any one of the first pipe and the second pipe and that expands toward the other, and
an inclined portion that is provided at an end portion of the other of the first pipe and the second pipe and that has a thickness decreasing toward the expansion portion,
wherein an abutment part that abuts against the expansion portion is provided at a position of the end portion which is different from the inclined portion in a circumferential direction.

2. The pipe branching device according to claim 1, wherein the inclined portion is provided on an entire periphery of the end portion in a circumferential direction.

3. The pipe branching device according to claim 1, wherein a branching position of the branch pipe is provided on an upstream side of the flow channel in a flowing direction of a main flow flowing in the main pipe.

4. The pipe branching device according to claim 1, wherein a flow channel sectional area of the flow channel is the same as a flow channel sectional area of the branch pipe.

5. The pipe branching device according to claim 1, wherein the flow channel is a hole or a slit provided in the second pipe.

6. A compressor comprising:
the pipe branching device according to claim 1,
wherein the second pipe is an outlet pipe.

7. A compressor comprising:
the pipe branching device according to claim 1,
wherein the second pipe is an inlet pipe.

8. A pipe branching device comprising:
a main pipe; and
a branch pipe that branches off from the main pipe,
wherein the main pipe includes a first pipe and a second pipe that is fitted to the first pipe in an axial direction of the first pipe,
a chamber that communicates with the branch pipe is provided between the first pipe and the second pipe, and
a flow channel that communicates with the chamber is provided from an inside of the second pipe,
wherein the first pipe has
an outer periphery-side end portion that is provided on an outer side of the second pipe and to which the second pipe is fitted, and an inner periphery-side end portion that is provided on an inner side of the second pipe and that configures a double pipe together with the outer periphery-side end portion, and the flow channel is a hole or a slit provided in the inner periphery-side end portion.

* * * * *